N. STARBUCK.
Churn Dasher.
No. 46,952.
Patented March 21, 1865.
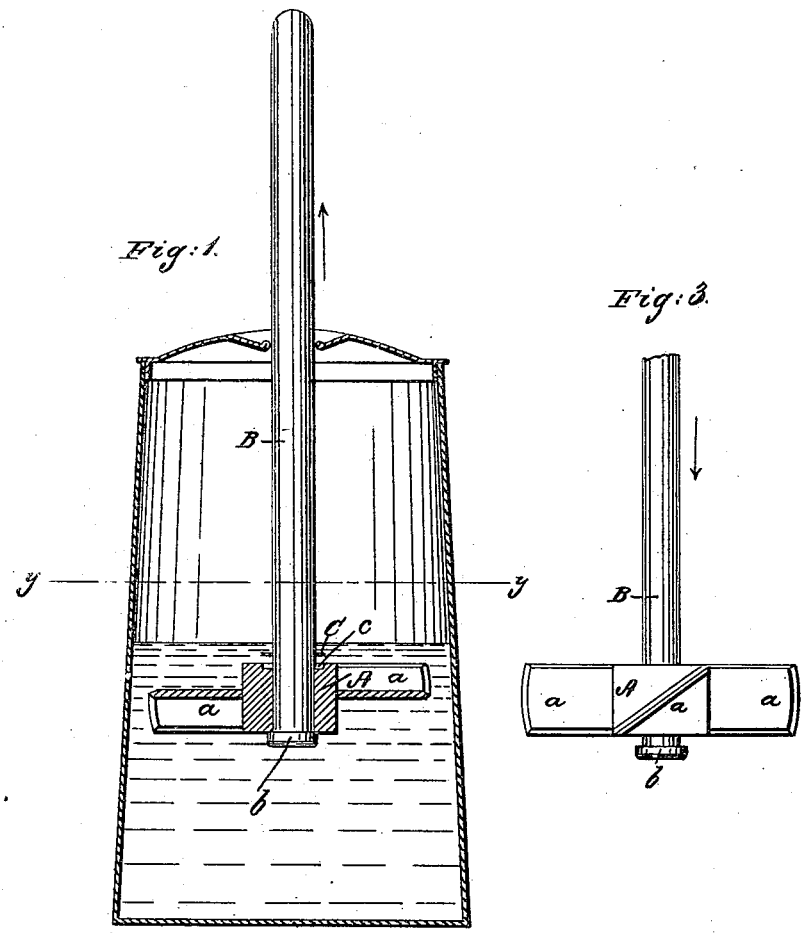
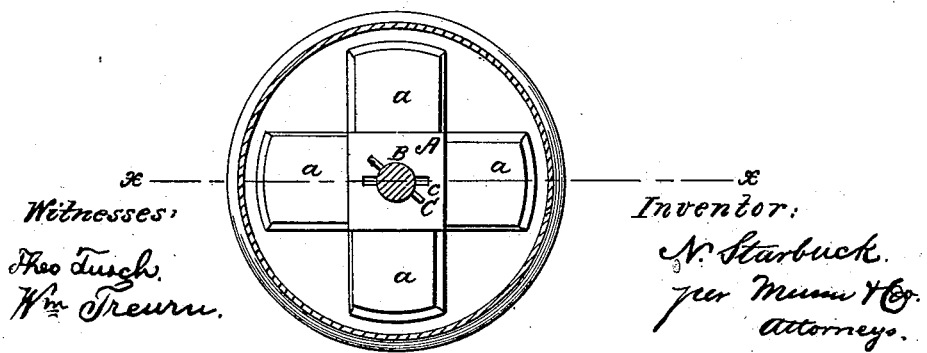

UNITED STATES PATENT OFFICE.

N. STARBUCK, OF WILMINGTON, OHIO.

IMPROVEMENT IN CHURN-DASHERS.

Specification forming part of Letters Patent No. 46,952, dated March 21, 1865.

*To all whom it may concern:*

Be it known that I, N. STARBUCK, of Wilmington, in the county of Clinton and State of Ohio, have invented a new and Improved Churn-Dash; and I do hereby declare that the following is a full, clear, and exact description thereof, which will enable others skilled in the art to make and use the same, reference being had to the accompanying drawings, forming part of this specification, in which—

Figure 1 is a vertical central section of a churn having my improved dash, $x\ x$; Fig. 2, indicating the line of section; Fig. 2, a horizontal section of the same, taken in the line $y\ y$, Fig. 1; Fig. 3, a side view of the dash.

Similar letters of reference indicate like parts.

This invention relates to an improvement in that class of churn-dashers which are placed loosely on their rods or staffs, so that they may rotate thereon under the action or resistance of the cream while being operated or worked up and down therein.

The object of the invention is to obtain a dash of the class specified which will rotate while being drawn upward through the cream and being held stationary while being forced down through the same, and thus work or operate without any adjustment of the parts by the operator. A dash arranged to operate in this way is rendered far more efficient than either the old fixed dash or the more recent rotating ones, from the fact that a greater agitation of the cream is obtained when the dash is forced down through it fixed to the rod or staff, and the butter gathered as fast as produced by the rotary motion of the dash as it is drawn upward through the cream. Thus the advantages of the old fixed dash and the recent rotary ones are combined.

In order to obtain the end above alluded to, I construct the dash A with a series of inclined wings, $a$, arranged very similar to the old fixed dash, and a hole is made through the bars of the arms where the former cross or are fitted over or one within the other, the rod or staff B passing loosely through said hole, so that the dash may turn freely on the latter.

The lower end of the rod or staff B is provided with a knob, $b$, to retain the dash upon it, and in the upper surface of the dash there is made a groove, $c$, which projects radially from the staff-hole at two opposite sides thereof.

C is a rod which passes transversely through the rod or staff B, and is of such dimensions that it may fit into the groove $c$. This rod is a short distance above the dash when the latter rests upon the knob $b$, as shown clearly in Fig. 1.

The operation is as follows: When the rod or staff B is drawn upward, the dash A will be rotated by the resistance the cream offers to the oblique or inclined wings $a$, the dash resting on the knob $b$, and its upper part or surface being free from the rod C. When, however, the rod staff is shoved downward, the groove $c$ will receive the rod C, the resistance offered by the cream causing the dash to press or bear against said rod C, and the dash will thereby be prevented from turning on the rod or staff B. Thus by this simple means the dash is prevented from turning or rotating while being shoved downward in the cream and allowed to rotate while being drawn upward, and the advantages stated in the preamble obtained.

I claim as new and desire to secure by Letters Patent—

The knob B, or an equivalent support, on the lower end of the rod or staff B, in connection with a rod, C, passing through the rod or staff, and a groove, $c$, or equivalent pins or projections, on the upper surface of the dash, all arranged to operate in the manner substantially as and for the purpose set forth.

N. STARBUCK.

Witnesses:
H. S. DOAN,
A. C. DIBOLL.